Jan. 8, 1935. C. E. McCORMICK Re. 19,416
WEATHER STRIP
Original Filed June 3, 1931
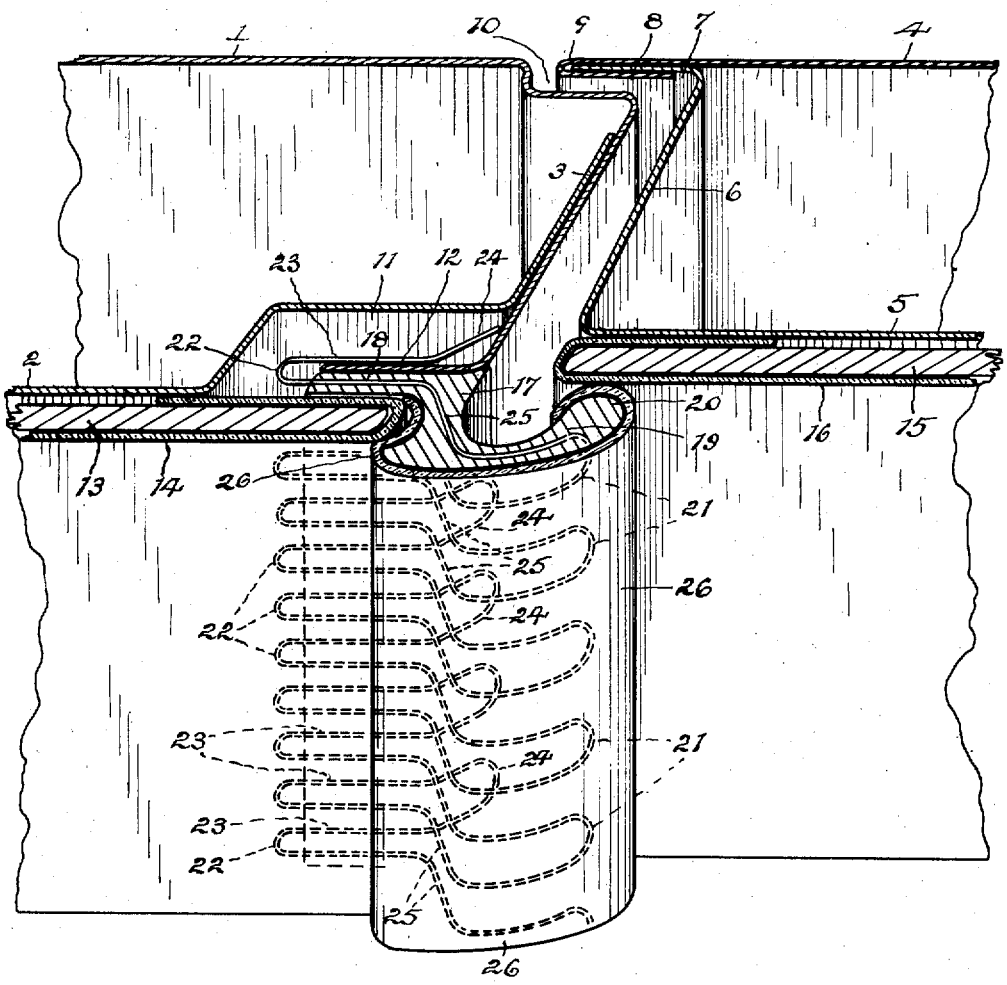
INVENTOR:
Charles E. McCormick
By Bethel & Bethel
Attorneys.

Reissued Jan. 8, 1935

Re. 19,416

UNITED STATES PATENT OFFICE 19,416

WEATHER STRIP

Charles E. McCormick, Royal Oak, Mich.

Original No. 1,899,100, dated February 28, 1933, Serial No. 541,822, June 3, 1931. Application for reissue October 25, 1933, Serial No. 695,193

6 Claims. (Cl. 296—44)

This invention relates to a weather strip and more particularly to a device of this character especially adapted for use upon motor vehicle bodies and the like and more particularly in connection with the door and other openings thereof. An object of the invention is to facilitate the application of the strip to the framing of the body or structure carrying the door or other closure, and to provide a strip having resilient stiffening means therein forming a transversely curved resilient free edge portion to span the crack or opening between the framing and closure and arranged to be flexed laterally by the closing of the closure. A further object is to provide a weather strip construction wherein the strip is free to bend laterally in applying the same to a curved opening for a closure, and is formed with hook-like members along one edge to engage over a member of the framing to hold the strip in place without the necessity for nailing or other rigid securing means, and whereby said strip may be rapidly and accurately applied.

With the above and other ends in view, the invention consists in providing the strip with a continuous, resilient reinforcing wire bent into tortuous shape to provide a plurality of resilient finger portions to reinforce an edge portion of the strip and with projecting hook members along the opposite edge of the strip, said wire reinforcement being enclosed by or embedded in the flexible material forming said strip, whereby said finger portions hold a projecting edge portion of the strip in form to be engaged by the closure and yieldingly force said edge into contact with said closure, and said projecting hook members are adapted to engage over a member of the framing surrounding the closure opening therein and hold said strip in proper relation to said closure without the necessity for permanent securing means, and so that said strip may be applied by simply sliding said hook members along said framing member, said strip with its wire reinforcement, bending freely in a lateral direction along curved portions of the opening with said hook guiding and holding the strip.

The invention further consists in the matters hereinafter set forth and more particularly pointed out in the appended claims, reference being had to the accompanying drawing, in which The figure thereof is a sectional perspective view of a closure and the framing surrounding said closure with a weather strip embodying the present invention applied to said framing and in operative relation to the closure.

As illustrative of an application of the present invention, the weather strip embodying said invention is shown as applied to the framing of an automobile body formed of sheet metal and showing a portion thereof adjacent a door opening in the body for a door also formed of sheet metal, but it will be understood that the same may be applied to other structures for closing the opening or crack between the framing surrounding an opening and a swinging or otherwise movable closure of any suitable construction for closing said opening.

As shown, 1 indicates the sheet of metal forming the outer side of the automobile body wall, and 2 the sheet forming the inner side thereof, the edge portions of these sheets being bent toward each other and overlapped at the edges of door or other opening in the body to provide a framing wall 3 for said opening, and where, as shown, the door closure for this opening is also formed of sheet metal and comprises an outer sheet 4 and an inner sheet 5, with an edge portion of the inner sheet bent outwardly to meet the outer sheet and form an end wall 6 and then turned laterally as at 7 to engage within an internal edge 8 of the outer wall and form therewith a door flange 9, an inset or groove 10 is provided in the body framing, to receive said door flange.

Preferably the wall 2 of the body along the framing 3 for the door opening is offset outwardly, forming a groove or channel 11 and the inturned edge portion of the wall 1 which overlaps the outturned edge portion of the wall 2 to form the framing wall 3 for the door opening, is extended part way across one end of said channel 11 and then bent laterally to form a flange 12 extending into and part way across said channel. As such automobile bodies are usually constructed, an inner sheathing 13 of fibrous material is secured to the wall 2 and provided with a fabric covering 14, the edge portion of such sheathing overlapping and nearly closing the inner open side of the channel 11 with the edge of said fabric carried around the projecting edge of said sheathing and secured thereto. A substantially closed channel 11 is thus formed in the framing of the door opening and is continuous along those edges of said opening to which it is desirable to apply a weather strip for making a tight joint between this framing and the edge or edges of the door at the inner side of the door.

The upper corner or corners of such automobile body door are often curved instead of being square and where such doors are used, the framing of the door opening is correspondingly curved, and in the present construction, the channel 11 will be extended along such curve or curves with the flange 12 extending thereinto and correspondingly curved, for a purpose hereinafter set forth. As is the usual practice, the door is also provided with an inner sheathing 15 of fibrous material covered by a fabric covering 16 which is carried around and made fast to the edge of such sheathing which is secured to the inner side of the door wall 5 with said edge substantially even with the end wall 6 of said door.

The present weather strip, which is particularly adapted for use upon automobile bodies constructed as above described but may be made applicable to other constructions, comprises a body strip 17 formed in any suitable manner, of rubber or other suitable flexible material and of a length to extend along the entire length of the framing of the door to which it is to be applied. This body is formed with a laterally extending securing flange 18 and an oppositely extending projecting flexible edge portion 19 to extend across the crack or opening between the door edge and the framing of the door opening, said flexible edge portion being curved in the direction of its width so that it will yield readily when the door comes into contact with the free edge thereof, which edge is rounded and thickened to form a contact bead 20 to engage the inside of the door. The strip is adapted to be secured to the flange 18 by means hereinafter described, the body 17 of said strip which connects said flange 18 and flexible edge portion 19, being thickened to give added strength with its inner side forming a continuation of the outer surface of the wall 3 of the framing of the door opening. The opposite side of this body portion is formed to engage over the edge of the sheathing 13 and rest thereon when the strip is flexed by the closing of the door against the contact bead 20 on the edge of the projecting flexible edge portion 19 of the strip.

As shown, the exposed surface of the weather strip will usually be covered by a fabric strip 26 mainly for appearance sake, one edge of such fabric strip being carried around the bead 20 and the opposite edge into the curved side of the body 17 beneath the projecting edge of the body sheathing 13, and this fabric cemented or otherwise secured flat upon the surface of the bead 20, edge portion 19 and body 17 to which it is applied. In so applying this fabric, the bead 20 provides a rounded edge to facilitate the application of the fabric and prevent it from wrinkling.

To reinforce the weather strip, and provide attaching means therefor and add resistance to flexure of the flexible edge portion 19 thereof, a spring wire is bent into a series of loops and this wire is embedded in the rubber strip when said strip is molded or otherwise formed, with one series of spring loops 21 extended into the curved edge portion 19 of the strip and curved to conform substantially to the lateral curvature of said edge portion, and a series of oppositely extending loops 22 with one run of each loop embedded in the flange 12 and the other run 23 extending substantially parallel with said flange and spaced therefrom to engage over the metal flange 18 with the runs 23 preferably yieldingly engaging the inner side surface of said flange and extending into the channel 11 of the framing of the door opening, to attach the weather strip thereto, the inner end of each run 23 being bent laterally and formed into loops 24 to connect with a like run below, these loops 24 being of a length to engage the end wall of the channel 11 and hold the body of the weather strip accurately and securely in place.

The spring fingers or loops 21 being curved laterally of the edge portion 19 of the strip with said strip, and being flexible, lend resiliency to said edge portion to hold it in firm contact with the door when the door is closed, and these spring fingers also tend to further curve this edge portion when it is out of contact with the door, thus further insuring firm contact with the door when swung into engagement therewith and flexing said edge. The portions 25 of the wire which connect the loops 21 and 22, are embedded in that portion 17 of the body which connects the securing flange 18 with flexible edge portion 19 and lend strength to the strip.

Weather strips formed entirely of rubber or of fabric covered rubber, soon become hard and disintegrated, and it is difficult to secure them evenly and securely in proper relation to the door to form a tight joint which will remain tight after extended use. By providing the strip with a large number of attaching loops 24 to engage over the metal flange 12 of the framing, the strip may be attached by simply engaging some or all of these loops over the flange and the attaching operation may be facilitated by moving the strip endwise of the flange, bringing the succeeding loops into position to embrace said flange, the loops sliding onto said flange and along the same. If the framing is curved at a corner of the door opening, said flange 12 is also curved, and the strip being flexible, will follow this curve and pass around the corner. Application of the weather strip to the framing is thus greatly facilitated as no nailing or separate fastening means is required and the loops 24 engaging the end wall of the framing channel 11, accurately position the strip relative to said wall and the door, insuring evenness and proper positioning.

Obviously this weather strip may be applied to other than sheet metal structures, and may be used in connection with sliding as well as swinging closures, and changes may be made in the particular construction and arrangement of the weather strip itself without departing from the spirit of the invention.

I claim:

1. A weather strip comprising a relatively thick body portion formed of flexible material and with an attaching flange integral therewith and extending laterally therefrom adjacent the inner edge thereof and an integral yieldable edge portion extending laterally from said body adjacent the outer end edge of said body and in a direction opposite that in which said flange extends, said body extending, in cross-section of said strip, at substantially right angles to said flange and edge portion, whereby said edge portion is offset outwardly from the plane of said flange.

2. A weather strip comprising a body portion formed of flexible material and having an attaching flange integral therewith and extending laterally therefrom adjacent the inner edge thereof to seat upon a structure to which the strip is to be attached, and a yieldable edge portion extending laterally from the side of said body opposite that provided with said flange and integral with said body adjacent the outer edge of said body, said body being formed with a longitudinal groove in its side outwardly of and adjacent said flange to receive the edge of sheathing to be applied to said structure.

3. A weather strip comprising an attaching flange adapted to seat upon a member to which said strip is to be attached, a flexible body integral with said flange along the inner edge of said body and extending outwardly therefrom, a transversely curved flexible closure engaging edge portion extending laterally from said body and integral with the outer portion of said body and lying in a plane offset outwardly by said body from the plane of the width of said flange, said body forming a relatively thick portion connecting said flange and edge portion and extending at substantially right angles to the planes of the width of said flange and edge portion, and a reinforcing wire formed with loops embedded in said edge portion and loops embedded in said flange with portions connecting said loops and embedded in said body portion.

4. In an automobile body having metal framing forming an outer jamb face and carrying a flanged member in rear of said face, and a trim panel mounted on the body, a molding strip comprising metallic means adapted to releasably hook over said member in rear of said jamb face for attaching the strip in position and also comprising a rubber strip provided with a body portion having a longitudinal channel at one lateral side to confine the edge of the trim panel and a longitudinal yieldable edge portion projecting from its opposite lateral side.

5. A molding or finishing strip for a vehicle body having a trim panel, comprising as a unit an integrally formed flexible rubber member and metallic means for attaching the strip to the body, said strip extending along and abutting the free edge of the panel and provided at one lateral side with a channel formed in part by said integral rubber member and adapted to receive said edge, said rubber member having a yieldable free edge portion projecting laterally from the opposite side thereof.

6. A combined molding and weather strip for the framing of an opening in a vehicle body provided with a closure for the opening, comprising a base of resilient material laterally flanged for releasable attachment along the edge of said framing, said base having an integral flexible flange projecting into the opening and adapted to overlie the closure and also having a projecting edge portion at its side remote therefrom to overlie the edge of a trim panel.

CHARLES E. McCORMICK.